US008615494B1

(12) United States Patent
Bagley et al.

(10) Patent No.: US 8,615,494 B1
(45) Date of Patent: Dec. 24, 2013

(54) SEGMENT-BASED METHOD FOR EFFICIENT FILE RESTORATION (75) Inventors: Paul Dwayne Bagley, Ham Lake, MN (US); Robert Koeten, Menlo Park, CA (US)

(73) Assignee: Symantec Corporation, Mountain View, CA (US)

( * ) Notice: Subject to any disclaimer, the term of this patent is extended or adjusted under 35 U.S.C. 154(b) by 66 days.

(21) Appl. No.: 13/560,210

(22) Filed: Jul. 27, 2012

Related U.S. Application Data (63) Continuation of application No. 12/410,713, filed on Mar. 25, 2009, now Pat. No. 8,255,366.

(51) Int. Cl.
*G06F 17/30* (2006.01)
*G06F 7/00* (2006.01)

(52) U.S. Cl.
USPC .......................................... 707/646; 707/647

(58) Field of Classification Search
USPC ................................................. 707/646, 647
See application file for complete search history.

(56) References Cited

U.S. PATENT DOCUMENTS

| | | | |
|---|---|---|---|
| 5,806,078 A | 9/1998 | Hug et al. | |
| 6,038,569 A * | 3/2000 | Beavin et al. | 707/646 |
| 6,401,239 B1 | 6/2002 | Miron | |
| 6,865,655 B1 * | 3/2005 | Andersen | 711/162 |
| 7,222,133 B1 * | 5/2007 | Raipurkar et al. | 707/642 |
| 7,266,574 B1 * | 9/2007 | Boudrie et al. | 707/646 |
| 7,395,386 B2 | 7/2008 | Barrs et al. | |
| 7,395,387 B2 | 7/2008 | Berkowitz et al. | |
| 7,478,113 B1 | 1/2009 | De Spiegeleer et al. | |
| 7,555,501 B2 | 6/2009 | Kohno | |
| 7,620,785 B1 | 11/2009 | Coulter et al. | |
| 7,634,627 B1 | 12/2009 | Ohr et al. | |
| 7,650,533 B1 | 1/2010 | Saxena et al. | |
| 7,653,624 B1 * | 1/2010 | Reitmeyer et al. | 707/646 |
| 7,685,180 B2 | 3/2010 | Lohn et al. | |
| 7,725,438 B1 | 5/2010 | Shah et al. | |
| 7,814,056 B2 | 10/2010 | McGrattan et al. | |
| 7,900,003 B2 | 3/2011 | Ben-Yehuda et al. | |
| 2001/0042073 A1 | 11/2001 | Saether et al. | |
| 2004/0128281 A1 | 7/2004 | Terazono et al. | |
| 2007/0027937 A1 * | 2/2007 | McGrattan et al. | 707/204 |
| 2008/0243878 A1 | 10/2008 | de Spiegeleer et al. | |

* cited by examiner

*Primary Examiner* — Pavan Mamillapalli
(74) *Attorney, Agent, or Firm* — Meyertons, Hood, Kivlin, Kowert & Goetzel, P.C.

(57) ABSTRACT

Various embodiments of a system and method for restoring a file are described herein. A previous version of the file may be split into segments and backed up to a server computer system. In response to a subsequent request to restore the file to the previous version, the current segments of the file may be compared to the backup segments stored on the server computer system. The segments that have changed may be retrieved from the server computer system and used to restore the corresponding segments of the current version of the file to their previous states. Segments that have not changed do not need to be transferred across the network from the server computer system. In further embodiments, one or more of the segments that have changed may be obtained locally from other files, thus further reducing the amount of data transferred across the network.

21 Claims, 6 Drawing Sheets

SEGMENT-BASED METHOD FOR EFFICIENT FILE RESTORATION

PRIORITY INFORMATION

This application is a continuation of, and claims priority to, U.S. patent application Ser. No. 12/410,713, entitled "Segment-Based Method for Efficient File Restoration," filed Mar. 25, 2009 now U.S. Pat. No. 8,255,366.

BACKGROUND OF THE INVENTION

1. Field of the Invention

This invention relates to computer software for backing up and restoring computer system files. More particularly, the invention relates to a system and method for efficiently restoring a file by splitting the file into segments and restoring only the segments that differ from a backup version of the file.

2. Description of the Related Art

Computer systems generally store information as files managed by a file system. Each file may be stored on a storage device, such as a disk drive, optical drive, tape drive, flash memory device, etc. It is often necessary to backup files by copying them to another storage device. For example, backup operations may be performed to guard against hardware failure or data loss, to provide a snapshot of files at a particular point in time, or to replicate files for other purposes.

In a networked computing environment, a plurality of client computer systems may each backup files to a backup server computer system. It is possible that an identical file is stored on multiple client computer systems. For example, two or more client computer systems may each store a copy of a file, where the data in each copy is identical. For example, client computer systems that execute the same operating system or the same software applications often have many identical files.

De-duplication techniques can be utilized so that only a single copy of each file is stored on the backup server computer system. For example, for each client computer system that has a copy of a particular file, the backup server computer system may store respective file metadata representing that copy. The portions of file metadata associated with each respective copy of the file may all reference a single instance of the file data (the actual contents of the file). In this way, the backup system can avoid the need to store multiple copies of identical files on the backup server computer system. A storage system which uses de-duplication to store and reference a single instance of data in order to avoid storing multiple copies of identical data is generally referred to as a single instance storage system.

SUMMARY

Various embodiments of a system and method for restoring a file are described herein. The file may be restored to a previous version of the file. According to some embodiments of the method, restoring the file may comprise determining a plurality of segments of the file and determining whether each segment of the plurality of segments differs from a corresponding segment of the previous version of the file. For each segment of the plurality of segments that differs, the data of the segment may be changed to the data of the corresponding segment of the previous version of the file. For each segment of the plurality of segments that does not differ from the corresponding segment of the previous version of the file, the method may determine that the segment data does not need to be changed.

BRIEF DESCRIPTION OF THE DRAWINGS

A better understanding of the invention can be obtained when the following detailed description is considered in conjunction with the following drawings, in which.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for restoring a file to a client computer system are described herein. The file may be restored to a previous version of the file, e.g., a version of the file that was backed up at a previous time. Briefly described, the method may operate to determine a plurality of segments of the file and determine whether each segment differs from a corresponding segment in the previous version of the file. Each segment that differs may be changed to its corresponding segment in the previous version of the file, e.g., to return the segment to its previous state as it existed at the time the file was backed up. Segments that do not differ from the corresponding segments in the previous version of the file do not need to be changed. Thus, the method may operate to change some segments of the file without changing others. This may increase the efficiency of restoring the file in some embodiments. For example, if the previous version of the file was backed up to a server computer system then the method may operate to retrieve only those backup segments stored on the server computer system that differ from the corresponding current segments of the file. This may reduce network bandwidth usage by reducing the amount of data that needs to be transferred from the server computer system, and may also reduce the amount of time required to restore the file.

In a further embodiment of the method, the efficiency of the system may be further increased by determining whether each backup segment that differs from its corresponding segment in the current version of the file is included in another file stored on the client computer system or stored on another local computer system before transferring the backup segment from the server computer system. If the backup segment is already stored locally in another file then the backup segment can be read from the local file, thus eliminating the need to transfer the backup segment from the server computer system. This may further reduce the amount of data transferred across the network from the server computer system to the client computer system.

Figure 1:
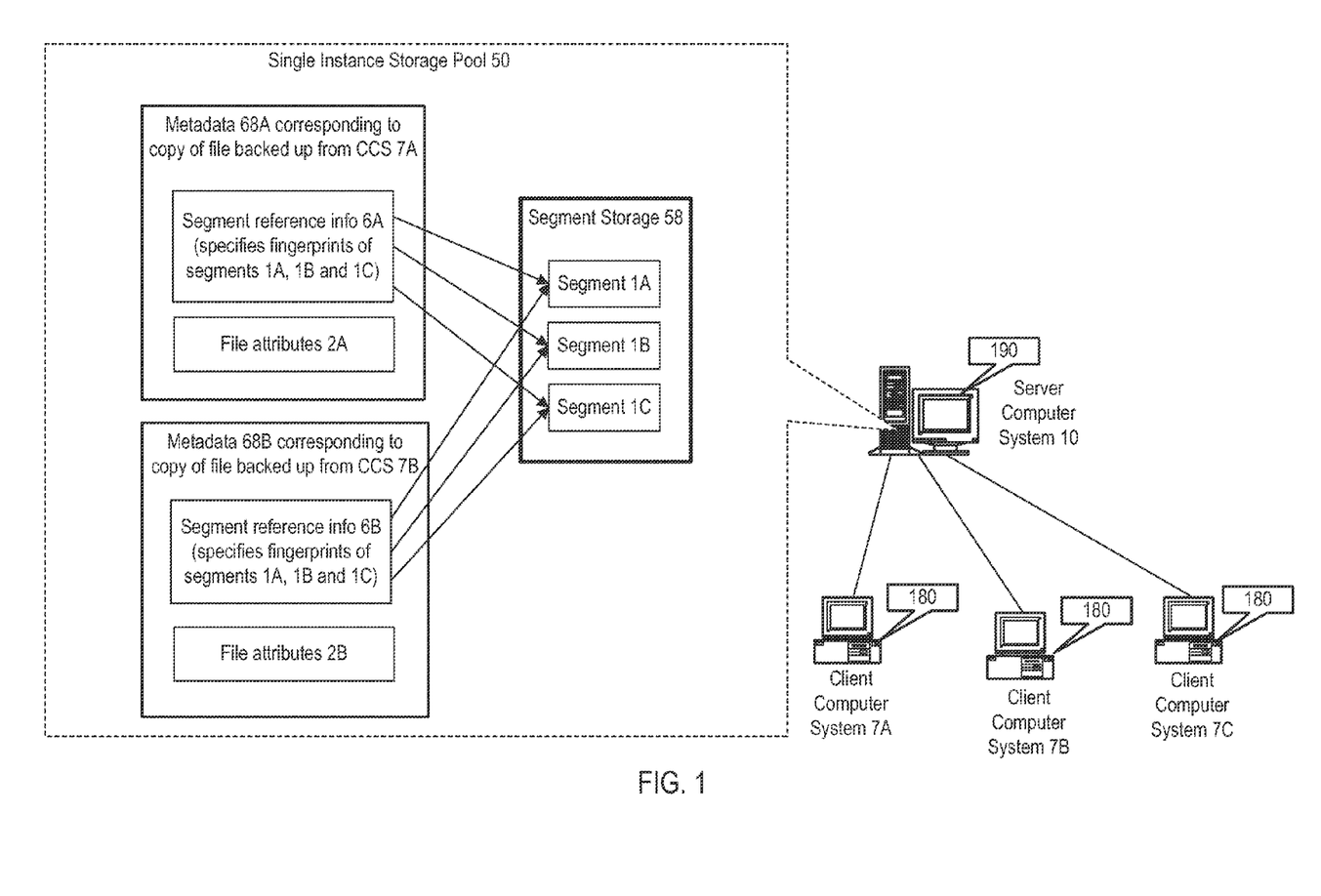
FIG. 1 illustrates a plurality of client computer systems that communicate with a server computer system to backup files to the server computer system.

Referring now to FIG. 1, the diagram illustrates a plurality of client computer systems 7 coupled to a server computer system 10. Each client computer system 7 executes client-side backup and restore software 180 which communicates with server-side backup and restore software 190 executing on the server computer system 10 to backup files from the client computer system 7 to the server computer system 10. The server computer system 10 may implement a segment-based single instance storage pool 50. For example, in some embodiments the client-side backup and restore software 180 on each client computer system 7 may split the files of the client computer system 7 into segments before transmitting them to the server computer system 10. The server computer system 10 may utilize de-duplication techniques so that only a single instance of each unique file segment is stored in the storage pool 50.

Suppose for example that two different client computer systems 7A and 7B each have an identical copy of a particular file. (The copies are said to be identical if the data contents of each copy are the same, although the file metadata or file system attributes of the two copies, such as their respective creation times, their pathnames, etc., may differ.) The two copies of the file may be backed up to the server computer system 10 in such a way that only a single copy of each data segment is stored in the storage pool 50 on the server computer system 10. For example, suppose that the copy of the file on the client computer 7A is first backed up to the server computer system 10. The client-side backup and restore software 180 executing on the client computer 7A may split the file into a plurality of segments and communicate with the server-side backup and restore software 190 executing on the server computer system 10 to determine whether the segments are already stored on the server computer system 10. Any segments not yet stored on the server computer system 10 may be transmitted to the server computer system 10 for storage.

The client-side backup and restore software 180 executing on the client computer system 7B may subsequently backup its respective copy of the file in a similar manner. For example the client-side backup and restore software 180 executing on the client computer system 7B may split the file into a plurality of segments identical to those produced by the client-side backup and restore software 180 executing on the client computer system 7A. In this case, the client-side backup and restore software 180 executing on the client computer 7B may determine from the server computer system 10 that all of the segments are already stored on the server computer system 10, and thus, the client-side backup and restore software 180 executing on the client computer system 7B may not transmit any of the segments to the server computer system 10.

In various embodiments the system may use any of various techniques to determine whether the segments of the file are already stored in the storage pool 50 on the server computer system 10. In some embodiments, the client-side backup and restore software 180 may perform an algorithm using the data of each segment to compute an ID or fingerprint of the segment, and may use the segment IDs or fingerprints to determine whether the segments are already stored in the storage pool 50. For example, the client-side backup and restore software 180 may transmit the fingerprints of the file segments to the server computer system 10. In response, the server-side backup and restore software 190 executing on the server computer system 10 may use the fingerprints to check to see whether copies of the segments are already stored in the storage pool 50. For example, each segment may be stored in the storage pool 50 in association with its respective fingerprint. The server-side backup and restore software 190 may then inform the client-side backup and restore software 180 of which of the segments (if any) are already stored in the storage pool 50.

Thus, the ID or fingerprint for each segment contains information useable to identify the segment. In various embodiments the segment fingerprints may be computed using various techniques. In some embodiments a hash function may be applied to the data of each segment in order to generate a hash value used as the segment fingerprint. The generated fingerprint is preferably considerably smaller in size than the size of the segment data. For example, in some embodiments the segment may include hundreds, thousands, or even millions of bytes of data, but the fingerprint may be only a few bytes. This may allow the fingerprints to be efficiently transmitted over a network from the client computer systems 7 to the server computer system 10.

FIG. 1 illustrates an example embodiment of the storage pool 50 after the respective copies of the file have been backed up from the client computer systems 7A and 7B. In this example, the storage pool 50 includes a segment storage area or database 58 in which the server-side backup and restore software 190 has stored the segments of the file, e.g., the three segments 1A, 1B and 1C in this example. The server-side backup and restore software 190 has also stored metadata 68A corresponding to the copy of the file backed up from the client computer system 7A, and metadata 68B corresponding to the copy of the file backed up from the client computer system 7B. Both the metadata 68A and 68B in this example include reference information 6 which specifies or references the segments 1A-1C, e.g., in order to identify which segments contain the data for the file. In various embodiments the reference information 6 may specify or reference the segments of the file either directly or indirectly in any of various ways. In the illustrated embodiment the reference information 6A in the metadata 68A and the reference information 6B in the metadata 68B specifies the fingerprints of the segments 1A-1C. The server-side backup and restore software 190 can use the fingerprints to subsequently locate the respective segments of the file in the segment storage 58, e.g., in the event that the file needs to be restored.

In addition to the reference information 6, the respective metadata 68 for each respective copy of the file may also specify various other attributes 2 of the copy of the file, e.g., file system attributes specifying properties of the copy of the file on the respective client computer 7 from which the copy of the file originated, such as the file's pathname, creation time, last modification time, etc.

Thus, for each copy of a file backed up to or stored on the server computer system 10 from a respective client computer 7, the server computer system 10 may store respective metadata 68 for the copy of the file in the storage pool 50. If different client computer systems 7 each backup respective copies of the same file then only a single instance of the file segments containing the file's data are stored in the storage pool 50, and the metadata entries corresponding to the various copies of the file all reference the same file segments.

Although the example of FIG. 1 only illustrates the three segments of the file discussed above which was backed up from the client computer systems 7A and 7B, the storage pool would typically also include many other segments of other files backed up from the client computer system 7A and 7B, as well as segments of files backed up from other client computer systems. It is noted that FIG. 1 illustrates one example of the architecture of the storage pool 50, and in other embodiments the storage pool 50 may be implemented in any of various other ways.

In various embodiments, the client computer systems 7 may be coupled to the server computer system 10 via any type of network or combination of networks. For example, each client computer system 7 may be coupled to the server computer system 10 via any type or combination of local area network (LAN), a wide area network (WAN), an Intranet, the Internet, etc. Examples of local area networks include Ethernet networks, Fiber Distributed Data Interface (FDDI) networks, and token ring networks. Also, each computer system may be coupled to the network using any type of wired or wireless connection medium. For example, wired mediums may include Ethernet, fiber channel, a modem connected to plain old telephone service (POTS), etc. Wireless connection mediums may include a satellite link, a modem link through a cellular service, a wireless connection using a wireless communication protocol such as IEEE 802.11 (wireless Ethernet), Bluetooth, etc. In some embodiments the server computer system 10 may be a remote computer system coupled to the client computer systems 7 through the Internet or another Wide Area Network (WAN).

It is noted that in some embodiments the system may include one or more additional server computers that assist in backing up the files from the client computer systems 7 to the server computer 10. For example, in some embodiments the system may include one or more media server computer systems. A client computer system 7 may not communicate directly with the server computer 10, but instead may communicate with a media server computer system. In some embodiments the files may first be transferred from the client computer system 7 to the media server computer system. The media server computer system may communicate with the server computer system 10 to determine which file segments are not yet stored in the storage pool 50 and may then transfer those file segments to the server computer system 10 without transferring file segments already stored in the storage pool 50.

In other embodiments all file segments may be transferred to the server computer system 10 regardless of whether or not they are already stored in the storage pool 50. The server computer system 10 may then determine which of the segments have not yet been stored in the storage pool 50 and may store only those segments, while existing segments may simply be re-referenced without storing duplicate copies in the storage pool 50.

Figure 2:
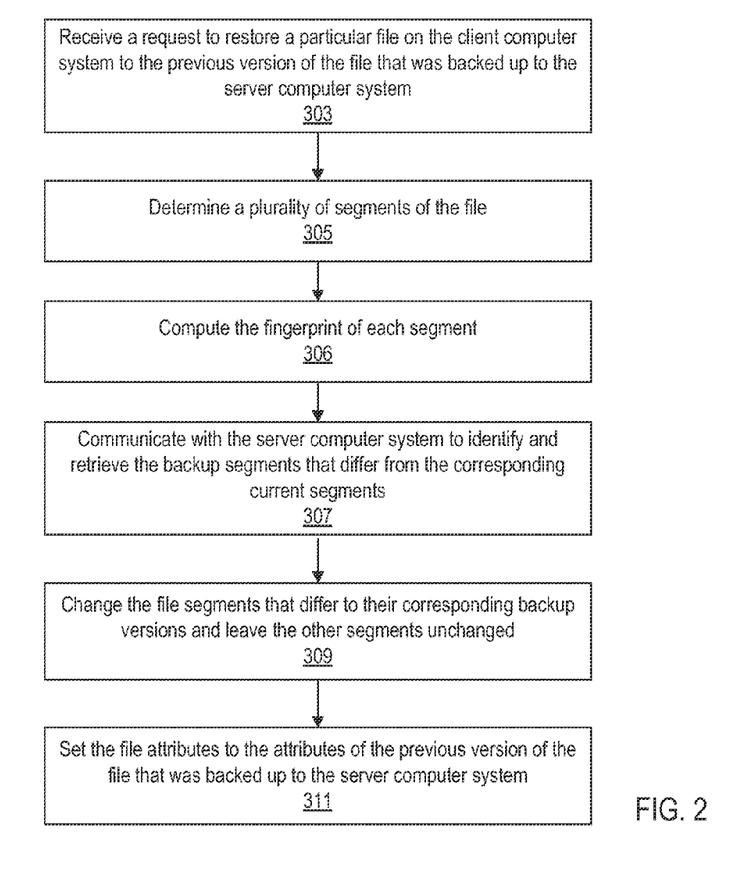
FIG. 2 is a flowchart diagram illustrating one embodiment of a method for restoring a file that was previously backed up to the server computer system.

Subsequently to backing up the files from a given client computer system 7 to the server computer system 10, a particular file that was backed up may be restored to the client computer system 7. For example, the file may be restored at a subsequent time after changes to one or more of the segments of the file have occurred since the time when the segments were backed up to the server computer system 10. FIG. 2 is a flowchart diagram illustrating one embodiment of a method for restoring the file that was previously backed up. The method may be implemented by the client-side backup and restore software 180 executing on the client computer system 7 in conjunction with the server-side backup and restore software 190 executing on the server computer system 10.

As indicated in block 303, the server-side backup and restore software 190 may receive a request to restore a particular file on the client computer system 7 to a previous version of the file that was backed up to the server computer system 10. In some embodiments the request may originate from a user of the client computer system 7. For example, the client-side backup and restore software 180 executing on the client computer system 7 may be configured to display a graphical user interface enabling the user to select which file (or files) to be restored. The graphical user interface may also enable the user to select a particular backup version of the file to use for the restoration. For example, in some embodiments the client-side backup and restore software 180 and server-side backup and restore software 190 may be configured to periodically perform backup operations to backup the files from the client computer system 7. Thus, the storage pool 50 on the server computer system 10 may store multiple versions of the file in question, e.g., where each version corresponds to a particular time when the file was backed up and represents the state of the file as it existed at that time. In some embodiments the user may select which backup version of the file to use for the restoration by selecting the time when the desired version of the file was backed up.

In block 305, the client-side backup and restore software 180 may determine a plurality of segments of the file, e.g., the current segments of the file as the file currently exists on the client computer system 7 at the time the restoration is initiated. The current segments of the file may be determined using a similar or identical algorithm as was used when the previous version of the file was split into segments while backing up the previous version of the file to the server computer system 10. Thus, segments of the file whose data has not changed since the previous version of the file was backed up may be identical to their corresponding backup versions that were previously stored on the server computer system 10. However, one or more of the segments will not be identical to the corresponding backup versions of the segments on the server computer system 10 since one or more changes have occurred to the file since the previous version of the file was backed up.

In some embodiments each segment may be a fixed size, such as 128 kb or another fixed size of N bytes. Thus, for example, one segment may be determined as the first N bytes of the file's data, the next segment may be determined as the next N bytes of the file's data, and so on. In other embodiments the segments may be determined in any of various other ways. Also, in some alternative embodiments the segments may vary in size. For example, in some embodiments the client-side backup and restore software 180 may analyze the file data to identify where each segment of the file should begin and end.

As shown in block 306, the client-side backup and restore software 180 may also compute the fingerprint of each segment. The segment fingerprints may be computed using the same algorithm as was used when the previous version of the file was backed up to the server computer system 10, e.g., by applying the same hash function to the data of the segment. Thus, segments which have not changed in the current version of the file on the client computer system 7 will have the same fingerprints as the fingerprints of the corresponding backup versions that were stored previously on the server computer system 10 when the previous version of the file was backed up.

As shown in block 307, the client-side backup and restore software 180 may also communicate with the server-side backup and restore software 190 executing on the server computer system 10 to identify and retrieve the backup segments that differ from the corresponding current segments. The fingerprints of the current segments of the file may be compared to the fingerprints of the corresponding backup segments stored on the server computer system 10 to identify which backup segments are different. For example, suppose that a first segment of the current version of the file corresponds to a first backup segment stored on the server computer system 10. If the fingerprint of the first backup segment is the same as the fingerprint of the first segment of the current version of the file then the data in the two segments is the same. In this case there is no need to retrieve the first backup segment from the server computer system 10 since the data in the current version of the file is already correct for this segment. On the other hand, if the fingerprint of the first backup segment is different from the fingerprint of the first segment of the current version of the file then the data in the two segments is different. In this case the first backup segment needs to be retrieved from the server computer system 10 so that the data it contains can be used to replace the data in the first segment of the current version of the file. Thus, as indicated in block 309, the client-side backup and restore software 180 may execute to change the file segments that differ to their corresponding backup versions and leave the other segments unchanged. In this way, the file is restored to the previous version that was backed up to the server computer system 10.

As indicated in block 311, the client-side backup and restore software 180 may also reset one or more attributes of the file to their previous values for the previous version of the file, i.e., to their values at the time when the file was previously backed up to the server computer system 10. As discussed above, in some embodiments various file attributes 2 of the previous version of the file may be stored in the metadata 68 for the file in the storage pool 50 on the server computer system 10. Thus, in some embodiments the client-side backup and restore software 180 may communicate with the server computer system 10 to retrieve the file attributes 2 stored in the metadata 68, and may then read one or more of the file attributes 2 and change the corresponding attributes of the current file to the specified values. For example, suppose that at the time the previous version of the file was backed up it had a most recent modification time attribute of Mar. 1, 2009 at 8:30 am. A write operation may have subsequently modified the file on Mar. 9, 2009 at 9:00 am, causing the most recent modification time attribute to be updated to this time. Suppose that this write operation caused the file to become corrupted. The file may then be restored to the previous version that was backed up. In addition to restoring the data segments that have changed to their previous states, the client-side backup and restore software 180 may also communicate with the server-side backup and restore software 190 to determine that the most recent modification time attribute of the previous version was Mar. 1, 2009 at 8:30 am. Since the file is being restored to the previous version, the most recent modification time attribute of the file may be reset to Mar. 1, 2009 at 8:30 am. In various embodiments, various other attributes of the file may also be reset to their previous values so that the attributes of the file correctly reflect the state of the file after it is restored.

In some embodiments the file may be restored by modifying the existing version of the file. For example, the data in each segment that has changed since the previous version of the file was backed up may be changed back to the data contained in the corresponding backup segment retrieved from the server computer system 10, and other data of the file may be left unchanged. In other embodiments the file may be restored by replacing the file with a new file. For example, for each segment that has changed since the previous version of the file was backed up, the data of the corresponding backup segment retrieved from the server computer system 10 may be copied into the new file. For each segment that has not changed, the data of the segment in the current version of the file may be copied into the new file. Once the file has been restored, the client-side backup and restore software 180 may inform the user that the restoration was successful.

Figure 3:
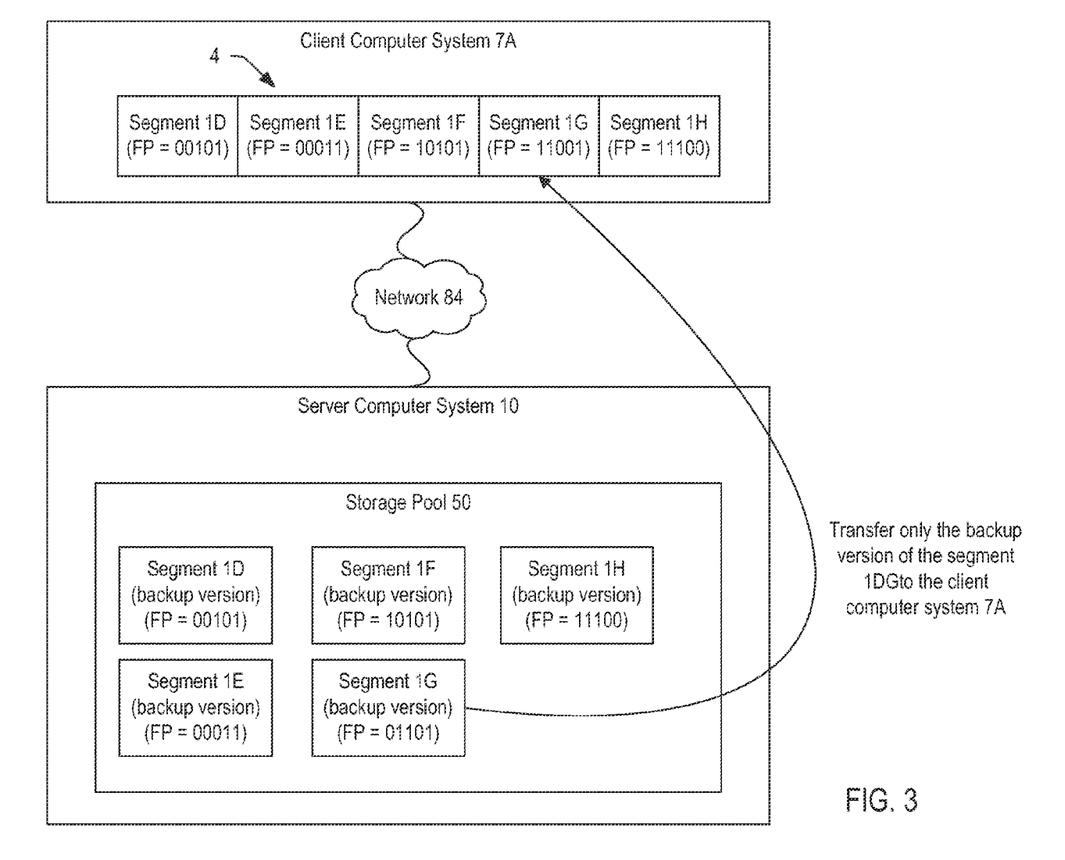
FIG. 3 illustrates an example of the method of FIG. 2 applied to restore a particular file to a client computer system.

FIG. 3 illustrates an example of the method of FIG. 2 applied to restore a particular file to the client computer system 7A. In this example the file was previously backed up to the server computer system 10. When the file was backed up, the file was split into five segments 1D-1H, and backup versions of the segments were stored in the storage pool 50.

Suppose that a write operation subsequently changed the data of the segment 1G (and no other segments) in the file on the client computer system 7A, and a user then requests to restore the file to the previous version that was backed up to the server computer system 10. As described above, the client-side backup and restore software 180 on the client computer system 7A may determine the boundaries of the current segments of the current version of the file similarly as the segment boundaries were previously determined when the previous version of the file was backed up. Thus, the current segment 1D corresponds to the backup version of the segment 1D stored on the server computer system 10, the current segment 1E corresponds to the backup version of the segment 1E stored on the server computer system 10, and so on.

In this example, each segment of the current version of the file contains identical data as the corresponding backup version of the segment stored on the server computer system 10, except for the segment 1G. As discussed above, the client-side backup and restore software 180 may compute the current fingerprints of the segments of the current version of the file and transmit them to the server computer system 10. The server-side backup and restore software 190 may use the metadata 68 corresponding to the file to identify the fingerprints of the backup segments in the storage pool 50 that compose the previous version of the file. The server-side backup and restore software 190 may compare the current segment fingerprints received from the client computer system 7A to the fingerprints of the corresponding backup segments stored in the storage pool 50. Thus, in this example the server-side backup and restore software 190 may determine that all of the current segment fingerprints match the fingerprints of the corresponding backup versions of the segments, except for the fingerprint of the segment 1G which does not match the fingerprint of the backup version of the segment 1G.

Thus, the server-side backup and restore software 190 may transmit only the data of the backup version of the segment 1G to the client computer system 7A without transmitting the data of the backup versions of the other segments. The client-side backup and restore software 180 on the client computer system 7A may then change the data in the segment 1G of the current version of the file to the backup segment data received from the server computer system 10. This is the only segment that needs to be changed to restore the file to its previous state.

Suppose that in this example the client computer system 7A is coupled to the server computer system 10 by a 56 kbps network connection. Suppose also that each of the five segments of the file is 20 MB in size. Some prior art file restoration methods would operate to transfer all of the previously backed up data of the file from the server computer system 10 to the client computer system 7A. Thus, 100 MB of data would be transferred across the network. According to the segment-based restoration method described above, however, only 20 MB of data would be transferred across the network, and the transfer time would be reduced to approximately one fifth of the amount of time required to transfer the entire file.

Figure 4:
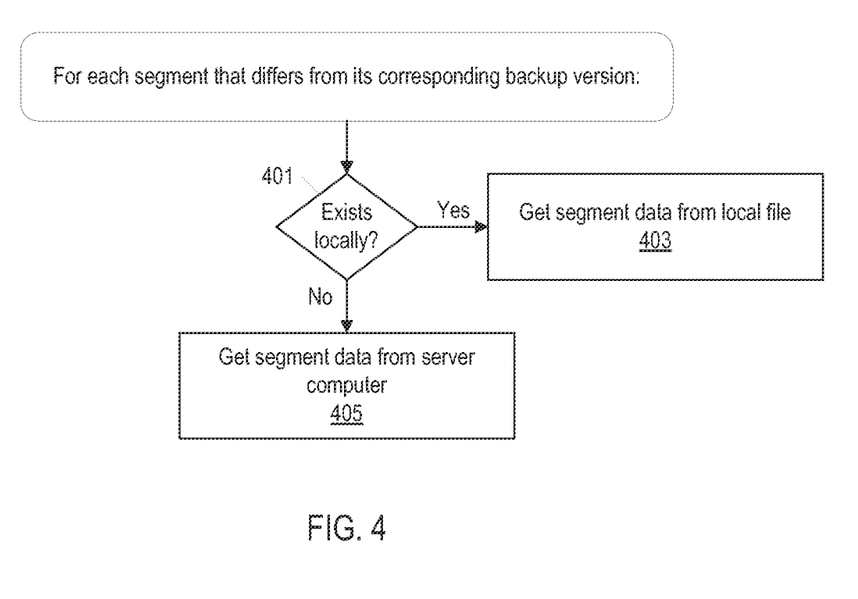
FIG. 4 illustrates an alternative embodiment of the method for restoring a file.

In an alternative embodiment of the method, the client-side backup and restore software 180 may not need to transfer the data for all of the segments that have changed from the server computer system 10 to the client computer system 7. Instead, the necessary data for one or more of the changed segments may be retrieved from another file on another computer system other than the server computer system 10. For example, in some embodiments data for one or more of the changed segments may be read from another file stored on the same client computer system 7, e.g., as illustrated in the flowchart of FIG. 4. The client-side backup and restore software 180 may identify which segments in the current version of the file have data that differs from the data in the backup segments stored on the server computer system 10. In some embodiments this determination may be made by transferring the fingerprints of the current segments to the server computer system 10, similarly as described above. In other embodiments the client-side backup and restore software 180 may maintain a local database on the client computer system 7 which specifies the fingerprints of the previous versions of the segments that were backed up to the server computer system 10. Thus, in some embodiments the backup and restore software 180 may be able to use the local database to compare the fingerprints of the current segments to the fingerprints of the previous versions of the segments in order to determine which segments of the file have changed without communicating with the server computer system 10.

As illustrated in block 401 of FIG. 4, for each segment of the file whose current data differs from the data of the corresponding backup version of the segment that was previously backed up to the server computer system 10, the client-side backup and restore software 180 may determine whether another file stored locally on the client computer system 7 includes a segment identical to the backup version of the segment. For example, if the file being restored is stored on a particular storage device of the client computer system 7, the client-side backup and restore software 180 may check to see whether another file stored on the same storage device includes a segment identical to the backup version of the segment. If another local file includes the segment then the client-side backup and restore software 180 may read the data of the segment from the other local file and use the data to change the appropriate segment in the file under restoration, as shown in block 403. This may eliminate the need to transfer the segment data to the client computer system 7 from the server computer system 10, which may further increase the efficiency of the file restoration in some embodiments. Otherwise, if another local file that includes an identical segment is not found then the data of the backup segment may be retrieved from the server computer system 10, as shown in block 405.

In various embodiment the client-side backup and restore software 180 may use various techniques to determine whether another local file includes a segment identical to the backup version of the segment. In some embodiments the client-side backup and restore software 180 may communicate with the server computer system 10 to make this determination. For example, the server-side backup and restore software 190 may check the metadata of the files that have been backed up from the client computer system 7 in order to determine whether any other file that was backed up also included the same segment. If so then the server-side backup and restore software 190 may inform the client-side backup and restore software 180 of which other file included the segment and where the segment is within the other file. The client-side backup and restore software 180 may then compute the fingerprint of the current version of that segment in the other file to determine whether it is still the same as it was when the other file was backed up to the server computer system 10. If so then the data of the segment can be used to restore the corresponding segment in the file under restoration. Otherwise, the data of the backup segment may be retrieved from the server computer system 10.

In other embodiments the client-side backup and restore software 180 may be able to determine whether another local file includes a segment identical to the backup version of the segment without communicating with the server computer system 10. For example, as noted above, in some embodiments the client-side backup and restore software 180 may maintain a local database on the client computer system 7 which specifies the fingerprints of the segments that were backed up to the server computer system 10. Thus, the client-side backup and restore software 180 may be able to use the local database to determine whether another local file has the required segment. In yet other embodiments the client-side backup and restore software 180 may dynamically search the files stored locally on the client computer system 7 to attempt to find a file with a matching segment, although performing such a search may be relatively inefficient compared to the other techniques discussed above.

In other embodiments the client computer system 7 may retrieve the data of one or more segments needed to restore the file from another file stored on another local computer system. As defined herein, another computer system is said to be local to the client computer system 7 if the client computer system 7 can communicate with the other computer system without having to transmit information over the Internet or another Wide Area Network (WAN). For example, in some embodiments the client computer system 7 may be coupled to a local area network (LAN), and the client computer system 7 may retrieve the data of one or more segments needed to restore the file from another computer system coupled to the LAN. As another example, the client computer system 7 may be located in a particular office or building and may retrieve the data of one or more segments needed to restore the file from another computer system in the same office or building. As another example, the client computer system 7 may be included in a particular network subset, and may retrieve the data of one or more segments needed to restore the file from another computer system in the same subnet.

In various embodiments the client computer system 7 may retrieve the segment data from the other local computer system using any of various techniques. For example, the segment data may be retrieved using a file sharing copy operation; a backup stream redirect (start backing up the segment on the other local computer system and re-direct the backup stream to a restore stream on the client computer system 7); local/subnet peer-to-peer file segment sharing; or any of various other techniques.

The client computer system 7 may also use any of various techniques to determine whether another local computer system has the needed segments. For example, in some embodiments the client computer system 7 may query the server computer system 10 to determine whether another local computer has a file with the needed segments. For example, if the file is being restored to a particular client computer system 7A then the server computer system 10 may have information indicating that client computer systems 7B and 7C are located locally to the client computer system 7A. The server computer system 10 may check the metadata stored in the storage pool 50 to determine whether the client computer systems 7B and 7C have previously backed up another file (or another copy of the same file) having the segment needed to restore the file on the client computer system 7A. If the local client computer system 7B or 7C has the needed segment then the client computer system 7A may retrieve the segment from there instead of the server computer system 10. In some embodiments this may be more efficient than transferring the data from the server computer system 10, e.g., if the server computer system 10 is located remotely from the client computer system 7A and/or is coupled to the client computer system 7A through a relatively slow network connection.

Figure 5:
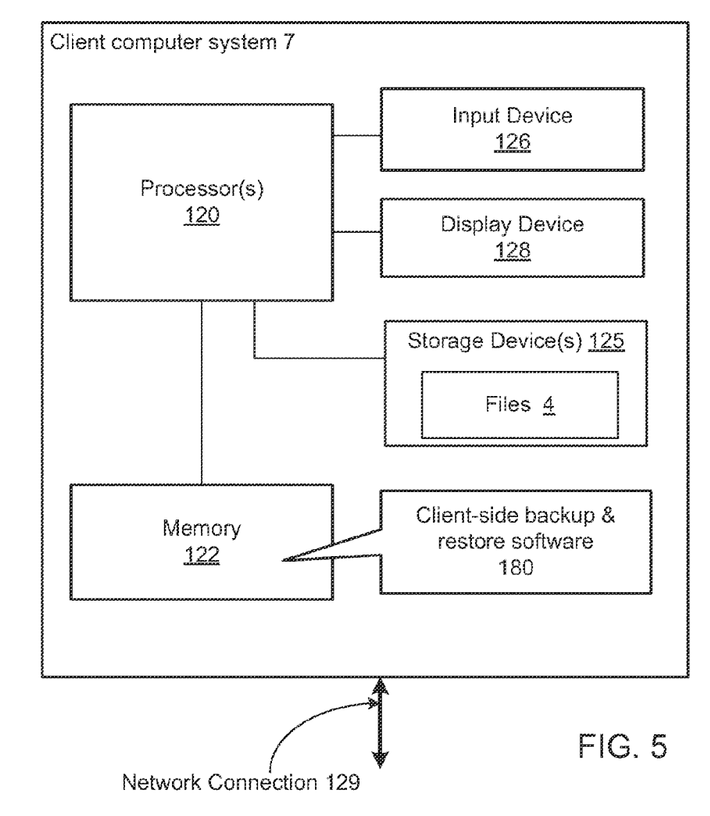
FIG. 5 illustrates an example of a client computer system according to one embodiment.

FIG. 5 illustrates an example of a client computer system 7 according to one embodiment. It is noted that FIG. 5 is provided as an example, and in other embodiments a client computer system 7 may be implemented in various other ways. In some embodiments the client computer system 7 may be a computer such as a personal computer system (PC), workstation, portable computer (e.g., laptop or notebook), personal digital assistant (PDA), television system, or other computing device or combination of devices.

The client computer system 7 includes one or more processors 120 coupled to memory 122. In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition.

The memory 122 may store program instructions and/or data. In particular, the memory 122 may store the client-side backup and restore software 180 which executes in conjunction with the server-side backup and restore software 190 to perform the functions described herein. The memory 122 may also store other software which operates in conjunction with or which is used by the client-side backup and restore software 180, such as operating system software, file system software, network communication software, device management software, etc.

It is noted that the processor 120 is representative of any type of processor. For example, in one embodiment, the processor 120 may be compatible with the x86 architecture, while in another embodiment the processor 120 may be compatible with the SPARC™ family of processors. Also, in some embodiments the client computer system 7 may include multiple processors 120.

The client computer system 7 also includes or is coupled to one or more storage devices 125. Files that are backed up from the client computer system 7 may originally be stored on the storage device(s) 125. In various embodiments the storage devices 125 may include any of various kinds of storage devices operable to store data, such as optical storage devices, hard drives, tape drives, flash memory devices, etc. As one example, the storage devices 125 may be implemented as one or more hard disks configured independently or as a disk storage system.

The client computer system 7 may also include one or more input devices 126 for receiving user input to the client-side backup and restore software 180. The input device(s) 126 may include any of various types of input devices, such as keyboards, keypads, microphones, or pointing devices (e.g., a mouse or trackball). The client computer system 7 may also include one or more output devices 128 for displaying output from the client-side backup and restore software 180 to the user. The output device(s) 128 may include any of various types of output devices, such as LCD screens or monitors, CRT monitors, etc.

The client computer system 7 may also include network connection hardware 129 through which the client computer system 7 couples to a network enabling communication with the server computer system 10. The network connection 129 may include any type of hardware for coupling the client computer system 7 to a network, e.g., depending on the type of network.

Figure 6:
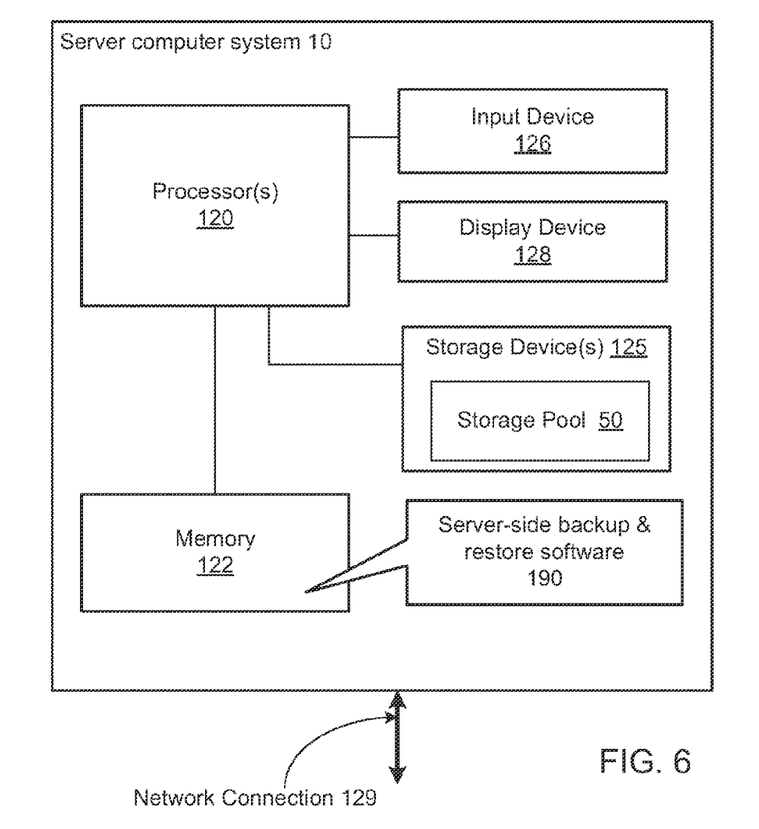
FIG. 6 illustrates an example of a server computer system according to one embodiment.

FIG. 6 illustrates an example of the server computer system 10 according to one embodiment. In various embodiments the server computer system 90 may include any number of individual computers or nodes, e.g., one or more. Thus, the components illustrated in FIG. 6 may be implemented in one or more individual computers or nodes.

The server computer system 10 includes one or more processors 120 coupled to memory 122. In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition.

The memory 122 may store program instructions and/or data. In particular, the memory 122 may store the server-side backup and restore software 190, which may be executed by the processor(s) 120. The server-side backup and restore software 190 may executes in conjunction with the client-side backup and restore software 180 to perform the functions described herein.

The backup server computer system 10 also includes or is coupled to one or more storage devices 125 on which the storage pool 50 is implemented. In various embodiments the storage devices 125 may include any of various kinds of storage devices operable to store data, such as disk drives, optical storage devices, tape drives, etc. As one example, the storage devices 125 may be implemented as one or more hard disks configured independently or as a disk storage system. As another example, the storage devices 125 may be implemented as one or more tape drives. In some embodiments the storage devices 125 may operate in a storage system or library device with which the server computer system 10 communicates via a communication bus or network.

The backup server computer system 10 may also include one or more input devices 126, one or more output devices 128, and network connection hardware 129, similarly as described above with reference to the client computer system 7.

It is noted that various embodiments may further include receiving, sending or storing instructions and/or data implemented in accordance with the foregoing description upon a computer-accessible storage medium. Generally speaking, a computer-accessible storage medium may include any storage media accessible by one or more computers (or processors) during use to provide instructions and/or data to the computer(s). For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer(s) may access the storage media via a communication means such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer-accessible storage medium storing program instructions executable by one or more processors to:
restore a previous version of a first file to a client computer system, wherein a current version of the first file is stored on the client computer system, wherein the previous version of the first file is stored on a server computer system, wherein the current version of the first file includes at least a first segment that has different data than a corresponding first segment of the previous version of the first file and a second segment that has different data than a corresponding second segment of the previous version of the first file;
wherein in said restoring the first file to the previous version, the program instructions are executable by the one or more processors to:
attempt to find another file stored on the client computer system with a segment including the same data as the corresponding first segment of the previous version of the first file;
in response to determining that another file with a segment including the same data as the corresponding first segment of the previous version of the first file was not found on the client computer system, retrieve the corresponding first segment of the previous version of the first file from the server computer system and copy the corresponding first segment into a particular version of the first file on the client computer system;
attempt to find another file stored on the client computer system with a segment including the same data as the corresponding second segment of the previous version of the first file;
in response to determining that a second file stored on the client computer system with a particular segment including the same data as the corresponding second segment of the previous version of the first file was found, retrieve the particular segment from the second file stored on the client computer system and copy the particular segment into the particular version of the first file on the client computer system.

2. The non-transitory computer-accessible storage medium of claim 1,
wherein the particular version of the first file is the current version of the first file;
wherein said copying the corresponding first segment into the particular version of the first file comprises replacing the first segment of the current version of the first file with the corresponding first segment of the previous version of the first file; and
wherein said copying the particular segment into the particular version of the first file comprises replacing the second segment of the current version of the first file with the particular segment from the second file.

3. The non-transitory computer-accessible storage medium of claim 1, wherein the program instructions are further executable by the one or more processors to:
analyze the first file to determine a plurality of segments of the first file, wherein the plurality of segments includes the first segment and the second segment.

4. The non-transitory computer-accessible storage medium of claim 3,
wherein each segment of the plurality of segments of the first file has the same number of bytes of data.

5. The non-transitory computer-accessible storage medium of claim 3,
wherein at least one segment of the plurality of segments has a different number of bytes of data than at least one other segment of the plurality of segments.

6. The non-transitory computer-accessible storage medium of claim 3,
wherein each segment of the plurality of segments of the first file corresponds to a corresponding segment of the previous version of the first file;
wherein the program instructions are further executable by the one or more processors to:
for each segment of the plurality of segments of the first file, determine an identifier of the segment based on data of the segment; and
determine whether each respective segment of the plurality of segments of the first file has different data than the corresponding segment of the previous version of the first file by determining whether the identifier of the respective segment differs from an identifier of the corresponding segment of the previous version of the first file.

7. The non-transitory computer-accessible storage medium of claim 6,
wherein the program instructions are executable by the one or more processors to determine the identifier of each segment by performing a hash function on the data of the segment.

8. The non-transitory computer-accessible storage medium of claim 6,
wherein, for each respective segment of the plurality of segments of the first file, the program instructions are executable by the one or more processors to determine whether the identifier of the respective segment differs from the identifier of the corresponding segment of the previous version of the first file by:
transmitting the identifier of the respective segment to the server computer system; and
receiving from the server computer system an indication of whether the identifier of the respective segment differs from the identifier of the corresponding segment of the previous version of the first file.

9. The non-transitory computer-accessible storage medium of claim 6, wherein the program instructions are further executable by the one or more processors to:
prior to said restoring the first file, store the identifiers of the corresponding segments of the previous version of the first file in a database on the client computer system;
wherein, in restoring the first file, the program instructions are executable by the one or more processors to retrieve the identifiers of the corresponding segments of the previous version of the first file from the database stored on the client computer system without communicating with the server computer system.

10. The non-transitory computer-accessible storage medium of claim 1,
wherein in said attempting to find another file stored on the client computer system with a segment including the same data as the corresponding second segment of the previous version of the first file, the program instructions are executable by the one or more processors to:
query the server computer system to determine whether another file stored on the client computer system has a segment including the same data as the corresponding second segment of the previous version of the first file; and
receive from the server computer system an indication that the particular segment of the second file stored on the client computer system includes the same data as the corresponding second segment of the previous version of the first file.

11. The non-transitory computer-accessible storage medium of claim 1,
wherein in said attempting to find another file stored on the client computer system with a segment including the same data as the corresponding second segment of the previous version of the first file, the program instructions are executable by the one or more processors to:
determine a fingerprint of the corresponding second segment of the previous version of the first file; and
access a database storing fingerprints of segments of files stored on the client computer system, wherein the database includes a fingerprint of the particular segment of the second file, wherein said accessing includes determining that the fingerprint of the particular segment of the second file matches the fingerprint of the corresponding second segment of the previous version of the first file.

12. The non-transitory computer-accessible storage medium of claim 11,
wherein the database storing the fingerprints of segments of files stored on the client computer system is stored on the client computer system.

13. The non-transitory computer-accessible storage medium of claim 11,
wherein the database storing the fingerprints of segments of files stored on the client computer system is stored on the server computer system.

14. The non-transitory computer-accessible storage medium of claim 1,
wherein the particular version of the first file is the current version of the first file.

15. The non-transitory computer-accessible storage medium of claim 1,
wherein in said restoring the first file to the previous version, the program instructions are further executable by the one or more processors to create a new version of the first file on the client computer system, wherein the particular version of the first file is the new version of the first file.

16. A method comprising:
restoring a previous version of a first file to a client computer system, wherein a current version of the first file is stored on the client computer system, wherein the previous version of the first file is stored on a server computer system, wherein the current version of the first file includes at least a first segment that has different data than a corresponding first segment of the previous version of the first file and a second segment that has different data than a corresponding second segment of the previous version of the first file, wherein said restoring the first file to the previous version comprises:
attempting to find another file stored on the client computer system with a segment including the same data as the corresponding first segment of the previous version of the first file;
in response to determining that another file with a segment including the same data as the corresponding first segment of the previous version of the first file was not found on the client computer system, retrieving the corresponding first segment of the previous version of the first file from the server computer system and copying the corresponding first segment into a particular version of the first file on the client computer system;
attempting to find another file stored on the client computer system with a segment including the same data as the corresponding second segment of the previous version of the first file; and
in response to determining that a second file stored on the client computer system with a particular segment including the same data as the corresponding second segment of the previous version of the first file was found, retrieving the particular segment from the second file stored on the client computer system and copying the particular segment into the particular version of the first file on the client computer system.

17. The method of claim 16,
wherein the particular version of the first file is the current version of the first file;
wherein said copying the corresponding first segment into the particular version of the first file comprises replacing the first segment of the current version of the first file with the corresponding first segment of the previous version of the first file; and
wherein said copying the particular segment into the particular version of the first file comprises replacing the second segment of the current version of the first file with the particular segment from the second file.

18. The method of claim 16,
wherein the first file further includes a third segment that has different data than a corresponding third segment of the previous version of the first file, wherein said restoring the first file further comprises:
determining that an other file stored on an other computer system other than the client computer system and other than the server computer system has an identical segment with the same data as the corresponding third segment of the previous version of the first file; and
retrieving the identical segment from the other file stored on the other computer system.

19. The method of claim 18,
wherein said determining that the other file stored on the other computer system has the identical segment comprises:
querying the server computer system to determine whether another computer system stores another file with a segment having the same data as the corresponding third segment of the previous version of the first file; and
receiving from the server computer system an indication that the identical segment is included in the other file on the other computer system.

20. The method of claim 19,
wherein the client computer system is included in a local area network (LAN);
wherein the other computer system is also included in the LAN.

21. A system comprising:
one or more processors; and
memory storing program instructions, wherein the program instructions are executable by the one or more processors to:
restore a previous version of a first file to a client computer system, wherein a current version of the first file is stored on the client computer system, wherein the previous version of the first file is stored on a server computer system, wherein the current version of the first file includes at least a first segment that has different data than a corresponding first segment of the previous version of the first file and a second segment that has different data than a corresponding second segment of the previous version of the first file;

wherein in said restoring the first file to the previous version, the program instructions are executable by the one or more processors to:

attempt to find another file stored on the client computer system with a segment including the same data as the corresponding first segment of the previous version of the first file;

in response to determining that another file with a segment including the same data as the corresponding first segment of the previous version of the first file was not found on the client computer system, retrieve the corresponding first segment of the previous version of the first file from the server computer system and copy the corresponding first segment into a particular version of the first file on the client computer system;

attempt to find another file stored on the client computer system with a segment including the same data as the corresponding second segment of the previous version of the first file;

in response to determining that a second file stored on the client computer system with a particular segment including the same data as the corresponding second segment of the previous version of the first file was found, retrieve the particular segment from the second file stored on the client computer system and copy the particular segment into the particular version of the first file on the client computer system.

* * * * *